United States Patent [19]

Mathur et al.

[11] Patent Number: 5,020,457
[45] Date of Patent: Jun. 4, 1991

[54] DESTRUCTION OF ACID GAS EMISSIONS

[75] Inventors: Mahendra P. Mathur, Pittsburgh, Pa.; Yuan C. Fu, Muroran, Japan; James M. Ekmann; John M. Boyle, both of Pittsburgh, Pa.

[73] Assignee: The United States of America as represented by the United States Department of Energy, Washington, D.C.

[21] Appl. No.: 541,992

[22] Filed: Jun. 22, 1990

[51] Int. Cl.$^5$ .............................................. F23J 11/00
[52] U.S. Cl. .................................. 110/345; 110/212; 423/216; 423/235; 423/237; 423/242; 431/5
[58] Field of Search ............... 423/210, 235, 237, 242; 110/212, 345, 346; 431/5

[56] References Cited

U.S. PATENT DOCUMENTS

| | | | |
|---|---|---|---|
| 4,760,820 | 8/1988 | Tozzi ............................... | 123/143 B |
| 4,766,855 | 8/1988 | Tozzi ............................... | 123/143 B |
| 4,779,545 | 10/1988 | Breen et al. ........................ | 110/212 |
| 4,820,391 | 4/1989 | Walker ............................. | 423/235 X |
| 4,878,442 | 11/1989 | Yeh et al. ............................ | 110/345 |
| 4,909,164 | 3/1990 | Shohet et al. ....................... | 110/346 |
| 4,954,320 | 9/1990 | Birmingham et al. .......... | 423/210 X |

OTHER PUBLICATIONS

Behbahani et al., "Combustion Science Technology", 1983, vol. 30, pp. 289-302.
Behbahani et al., "Combustion Science Technology", 1982, vol. 27, pp. 123-132.
Jones; "Technical and Economic Feasibility of Ammonia Based Post Combustion $NO_x$ Control", EPRI-CS2713, 11-82.
Neal, "Proceedings of the Department of Energy Flue Gas Cleanup Contractors Review Meeting", 6-84.

*Primary Examiner*—Edward G. Favors
*Attorney, Agent, or Firm*—Hugh W. Glenn; Robert J. Fisher; William R. Moser

[57] ABSTRACT

A method of destroying $NO_x$ and $SO_2$ in a combustion gas in disclosed. The method includes generating active species by treating stable moleucles in a high temperature plasma. Ammonia, methane, steam, hydrogen, nitrogen or a combination of these gases can be selected as the stable molecules. The gases are subjected to plasma conditions sufficient to create free radicals, ions or excited atoms such as N, NH, $NH_2$, $OH^-$, CH and/or $CH_2$. These active species are injected into a combustion gas at a location of sufficiently high temperature to maintain the species in active state and permit them to react with $NO_x$ and $SO_2$. Typically the injection is made into the immediate post-combustion gases at temperatures of 475°-950° C.

17 Claims, 1 Drawing Sheet

DESTRUCTION OF ACID GAS EMISSIONS

CONTRACTUAL ORIGIN OF THE INVENTION

The United States Government has rights in this invention pursuant to the employee/employer relationship of some of the inventors to the U.S. Department of Energy at the Pittsburgh Energy Technology Center.

BACKGROUND OF THE INVENTION

The present invention relates to a process for removing or destroying acid gas constituents such as $NO_x$ and $SO_2$ present in combustion gases.

Flue gases resulting from the combustion of carbonaceous fuels contains substantial quantities of pollutants including nitrogen oxide and sulfur dioxide. These pollutants can combine with other substances found in the atmosphere to produce serious environmental hazards such as acid rain and smog. It is therefore desirable to destroy or remove these pollutants before they are dispersed into the atmosphere.

There are two types of methods for removing or destroying acid producing constituents from combustion systems. One type known as combustion modification requires control over the combustion reaction producing pollutant. These techniques have generally achieved 50–60% reduction in $NO_x$ emissions from conventional combustion systems.

A specific type of combustion modification, known as re-burning, has achieved reductions approaching seventy percent. Using this technique, a secondary fuel source is introduced downstream of the primary combustion zone to achieve reductions of $NO_x$. This technique, however is disadvantageous in that it requires large amounts of secondary fuel to accomplish the re-burning of $NO_x$. This method is not effective when more than seventy percent removal of effluent $NO_x$ is required.

A second type of removal method is known as post-combustion clean-up. In this method, the pollutant is removed down-stream of its formation. These techniques are more complex and expensive but are useful when $NO_x$ reduction levels higher than 70% are necessary. In some systems a dry scrubbing sorbent or an aqueous sorbent such as an active metal chelate are typically used to remove $NO_x$ and other pollutants. One system proposed by Walker in U.S. Pat. No. 4,820,391 discloses scrubbing with an aqueous sorbent containing a metal chelate and regenerating the sorbent including the use of electrodialysis.

One other system, illustrated in U.S. Pat. No. 4,878,442 to Yeh et al., includes the combination of a low pollutant burner with a scrubber and regeneration system. This system, though obtaining high removal of $NO_x$, involves the complicating aspects of the two combined systems.

In a study on the feasibility of ammonia-based post combustion $NO_4$ control (EPRI CS-2713, November, 1982), a peak $NO_x$ removal efficiency of 55% was predicted because of high levels of ammonia carryover. Ammonia is a pollutant and its presence can result in corrosive ammonia salts. Although higher removal efficiencies have been attained under well-controlled laboratory conditions, temperature gradients, ammonia-flue gas mixing limitations, and poor flow distributions all increase ammonia carryover, which limits the removal efficiency.

In one other research effort (Behbahani et al., Combustion Science and Technology, (1983), Vol. 30, 289–302), nitrogen oxides are destroyed by nitrogen atoms generated in a plasma jet. This research effort investigates the removal of NO from an unheated inert gas stream by passing such flow within about two centimeters of the discharge of the plasma jet containing nitrogen. Nitrogen oxide removal of less than 50% at efficiencies below 30% are reported.

SUMMARY OF THE INVENTION

Therefore in view of the above, it is an object of the present invention to provide an improved process for destroying acid producing constituents within a combustion gas.

It is also an object to provide a process for i destroying $NO_2$ and $SO_2$ constituents in emission gases.

It is likewise an object of the invention to provide a method for removing high percentages of nitrogen oxide in a combustion gas without the need for complete gas scrubbing.

It is a further object of the invention to provide a method employing activated species for removing acid gas constituents.

In accordance with the present invention, a method of destroying $NO_x$ and $SO_2$ constituents in a combustion gas is provided. The method includes generating active species by treating stable molecules of a precursor in a high temperature plasma and thereafter injecting the active species into a combustion gas at a high temperature location prior to complete removal of the useful energy from the gas.

In other more specific aspects of the invention, the active species are selected from free radicals, ions, and excited atoms including N, NH, $NH_2$, $OH^-$, CH and $CH_2$.

In other specific aspects of the invention, the precursor to the active species includes stable molecules selected from ammonia, methane, steam, hydrogen and nitrogen. The active species, NH and $NH_2$, can be generated by subjecting ammonia gas to plasma conditions.

In other more particular aspects of the invention, the active species are injected into the combustion gases while the combustion gases are at a temperature of at least 475° C., but no more than 950° C., preferably at a temperature of 600–900° C. The inventors have found that these elevated temperatures maintain the activity of the active atomic species.

The method of the invention also comprehends destroying an acid producing constituent in a combustion gas by passing an active species precursor into a plasma to generate an active species capable of reacting with the acid producing constituent and thereby form a generally innocuous product. The active species are injected into the combustion gas at a location prior to complete extraction of useful energy from the gas while the gas is at a sufficient temperature to prevent quenching of the active species and to permit reaction of the active species with the acid producing constituent.

In a specific mode of carrying out the method, the active species precursor is provided in a stoichiometric amount of no more than 300% of the $NO_x$ in the combustion gas but in a mole ratio of about 1:5 to 1:20 to the carrier gas.

In other aspects of the invention, the active species are entrained in a carrier gas selected from nitrogen, argon or helium.

DETAILED DESCRIPTION OF THE DRAWING

Figure 1:
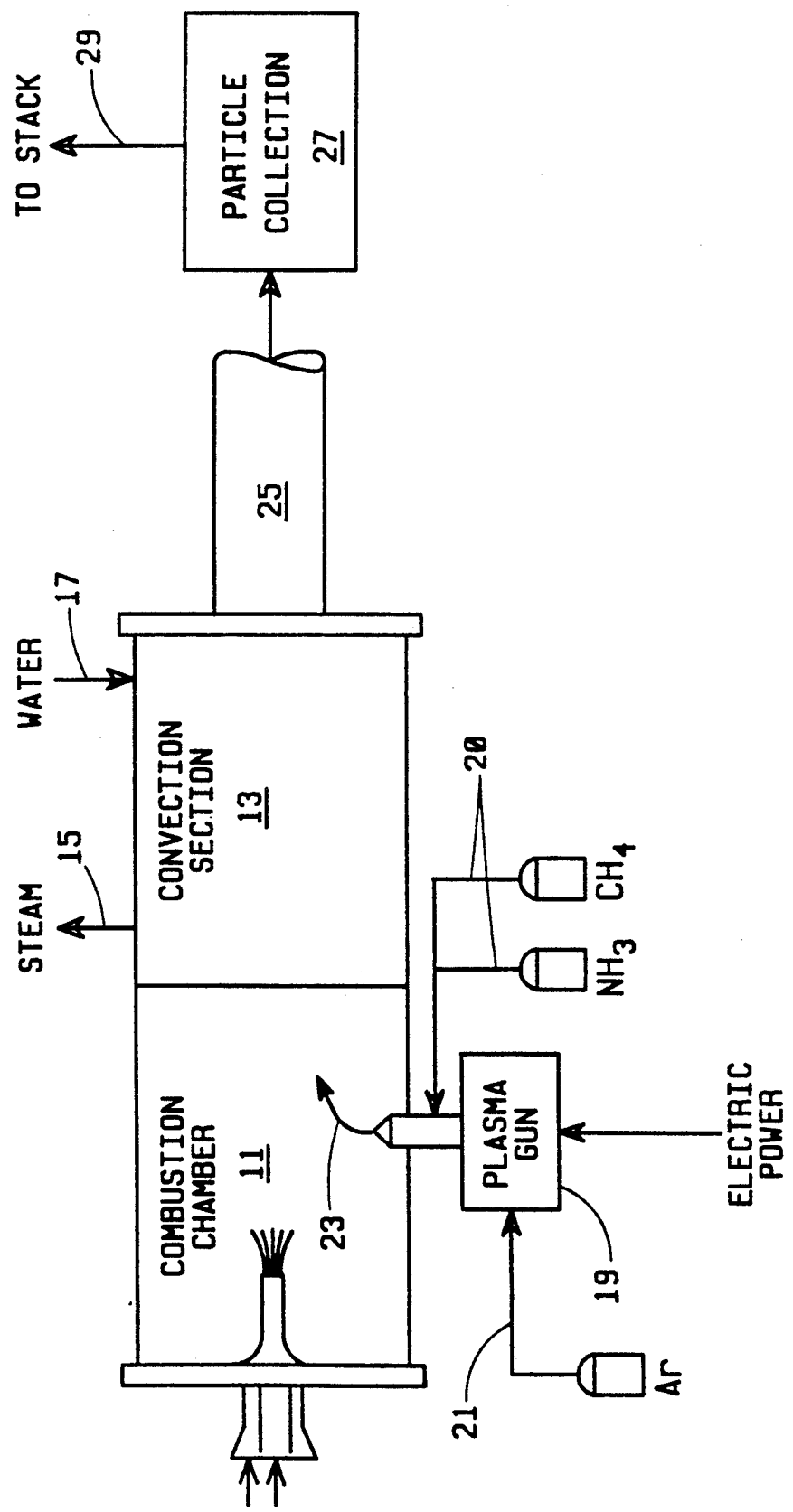

The present invention is illustrated in the accompanying drawing wherein FIG. 1 is a diagram of a process for the reduction of $NO_x$ and $SO_2$.

DETAILED DESCRIPTION OF THE INVENTION

Referring to FIG. 1 where combustion gas is generated in a furnace or other combustion chamber 11 and passed on to a convection section 13 where useful energy is extracted from the gases such as in the production of steam 15 from water 17. It should be understood that various other applications and uses can be made of the hot gases generated in combustion chamber 11, for instance, in driving turbines, raising steam and magnetohydrodynamic devices. Following extraction of useful energy, the gases are withdrawn through conduit 25, passed through particle collection 27 and discharged to the stack through conduit 29.

A plasma generating device, illustrated as plasma gun 19, acts on an inert carrier gas 21, for example argon, to produce a plasma. Gases 20, in stable molecular form, are exposed to the plasma and are thereby converted to active species 23 injected into the combustion chamber 11 downstream of the flame or into the high-temperature portion of convection section 13. The active species are introduced into the combustion gases well before all of the useful energy has been extracted. Typically, the active species will be injected into the combustion gases while they are still at a temperature of more than 475° C. but not more than 950° C., preferably at 600–900° C. Temperatures below 475° C. may permit the active species to condense or be quenched to a stable form while temperatures substantially above 950° C. can break down or otherwise modify many of the gases in the combustion plume. However, a reduction in nitrogen oxides and other acid producing pollutants can be expected even at temperatures above 950° C.

The inventors have found that these active species will react with acid producing gases such as $NO_x$ and $SO_2$ to form nitrogen gas or to oxidize $SO_2$ to $SO_3$ for subsequent removal. In so doing, the method destroys various forms of acid gas constituents including nitrogen oxides ($NO_x$) and $SO_2$. Several of the nitrogen oxides including $NO$, $N_2O_3$, $NO_2$, and $N_2O_5$ as well as $SO_2$ form acids that can result in acid rain or smog when combined with water.

Plasma-generating device 19 can be any one of a number of devices for generating temperatures in excess of those at which stable molecules break into constituent parts such as radicals, ions or excited atoms. It is contemplated that an electrically driven plasma torch or a high-temperature, combustion-based torch can be selected for use. A preferred plasma torch will have a plurality of electrical arcs between cathode and anode members to provide temperatures of at least 1700° C. and include an annular gas chamber arranged to provide swirling action to gases injected into the plasma.

Precursors such as stable molecules of ammonia, nitrogen, hydrogen, steam, methane or combinations of these gases are mixed into a carrier gas such as nitrogen, argon or helium illustrated at 21. These precursors are converted to active species that can include free radicals, ions, or excited atoms within the plasma. For example N, NH, NH2, CH and CH2 as well as OH⁻ are expected to be formed when the corresponding precursors are injected into the plasma. The OH⁻ ion is of particular value in reacting with $SO_2$ to form $SO_3$.

Although any of the above listed stable precursors and resulting active species can be selected for use, the radicals of ammonia, amidogen (NH2) and imidogen (NH) are a preferred selection. Unlike N, neither NH2 nor NH readily react with carbon monoxide or carbon dioxide to form NO and accordingly are more suitable for use with combustion gases. Both amidogen and imidogen react very quickly with NO as follows.

$$NH_2 + NO \rightarrow N_2 + H_2O \qquad (1)$$

$$NH + NO \rightarrow N_2O + H \qquad (2)$$

The products nitrogen gas ($N_2$) and nitrous oxide ($N_2O$) are generally innocuous and can be released with the stack gases.

Atomic nitrogen (N) created in the dissociation of $N_2$ reacts less quickly with NO.

$$N + NO \rightarrow N_2 + O \qquad (3)$$

Through chemical modelling the inventors predict that a competing reaction with $CO_2$ will substantially weaken the reduction potential of N.

$$N + CO_2 \rightarrow NO + CO \qquad (4)$$

Super-equilibrium concentrations of CO will be present when Reaction (4) becomes significant. In view of reaction 4, argon and helium are preferred over nitrogen as carrier gases.

The presence of free hydrogen (H), such as produced in reaction 2, will accelerate the dissociation of $NH_3$ into its radical forms. These radicals are themselves susceptible to further dissociation by H atoms. Methane may serve as a free hydrogen sink at high temperatures where H atoms will be present in significant quantities. A small amount of methane will catalyze the reduction of H to $H_2$ as in the following reactions.

$$CH_4 + H \rightarrow CH_3 + H_2 \qquad (5a)$$

$$CH_3 + H \rightarrow CH_4 \qquad (5b)$$

Combining reactions 5a and 5b gives the net reaction:

$$2H \rightarrow H_2 \qquad (5)$$

At the lower temperatures where H concentrations are necessary to stimulate the decomposition of $NH_3$, methane and hydrogen can serve as free hydrogen sources. The addition of methane has been found to enhance the destruction of NO.

The following example is submitted merely by way of illustration and is not intended to limit the invention to any extent beyond that defined in the claims.

EXAMPLE 1

Argon gas at about 100 scfh was heated to plasma temperature by a plurality of electrical arcs in a TAFA model 90, 40kw DC plasma torch operating with an input power of about 1.5kw output. Ammonia and methane gas flow at about 10 and 2.3 scfh respectively were swirled into the argon plasma through off-center ports from an annular chamber downstream of the electrical arcs in the torch. These combined gases containing amidogen and imidogen radicals were injected into a combustion gas at a location having a temperature of about 760° C. and a flow velocity of about 125 feet per second. The combustion gas was produced by the combustion of #2 fuel oil with NO added to attain a $NO_x$ level of about 700 ppm. The ammonia flow into the plasma torch was about three times that of the added NO. Analyses of combustion gas samples above and below the injection of radicals from the plasma torch indicated more than 80% reduction of $NO_x$.

EXAMPLE II

The procedure of Example I was followed except that NO was added into the combustion gas to attain a $NO_x$ level of about 1500 ppm. Again, the ammonia flow into the plasma torch was about three times that of the added NO. Analyses of gas samples above and below the injection point of the radicals from the plasma torch indicated more than 80% reduction in $NO_x$ was obtained.

As seen, the method of this invention affords considerable flexibility in selecting the point for radical injection. The active species can be injected into the immediate post-combustion gases at temperatures of up to 950° C. or at locations of lower temperatures towards the convection section of the furnace. In order to obtain a high level of acid gas destruction and to avoid any breakthrough of $NH_3$ precursor, temperatures of at least 475° C. should be present at the point of injecting the active species.

In addition to the above, the inventors have found that the electric energy for the plasma torch need be no more than about 1–1.5% of that gained by combustion of the gases. Of this energy, much is recoverable as the carrier gas and active species are injected prior to full energy extraction from the system.

Although the present invention is described in terms of specific materials and process steps, it will clear to one skilled in the art that various changes and modifications may be made in accordance with the invention described in the accompanying claims.

The embodiment of the invention in which an exclusive property or privilege is claimed is defined as follows:

1. A method of destroying $NO_x$ and $SO_2$ species in a combustion gas comprising;
    generating active species by treating stable molecules in a high temperature plasma;
    injecting the active species into the combustion gas at a location where the combustion gas is at a sufficiently high temperature to maintain the species in active state.

2. The method of claim 1 wherein the active species are selected from the group of atomic and molecular species consisting of free radicals, ions and excited atoms.

3. The method of claim 2 wherein the active species are selected from the group consisting of N, NH, $NH_2$, $OH^-$, CH and $CH_2$.

4. The method of claim 1 wherein the stable molecules are selected from the group consisting of ammonia, methane, steam, hydrogen and nitrogen and are subjected to plasma conditions sufficient to create the active species.

5. The method of claim 4 wherein the stable molecule is ammonia and the radicals NH and $NH_2$ are formed as the active species in the plasma.

6. The method of claim 1 wherein the plasma is generated by electric arc and is at a temperature of at least 1700° C.

7. The method of claim 1 wherein the combustion gases receiving the active species are at a temperature of at least 475° C. but not more than 950° C.

8. The method of claim 7 wherein the combustion gases are at a temperature of 600° C. to 900° C.

9. The method of claim 1 wherein the active species are entrained in a carrier gas selected from the group consisting of nitrogen, argon and helium.

10. The method of claim 9 wherein the carrier gas is an inert gas selected from argon and helium.

11. The method of claim 1 wherein the active species are injected into the post-combustion zone prior to complete extraction of process energy from the gas.

12. The method of claim 1 wherein the active species are conveyed in a carrier gas at a temperature of at least 475° C. until injected into the combustion gas at a temperature of more than 475° C.

13. A method of destroying an acid producing constituent in a combustion gas comprising:
    passing an active species precursor into a plasma to generate an active species capable of reacting with the acid producing constituent to form a generally innocuous product;
    injecting the active species into the combustion gas at a location prior to complete extraction of useful energy from the gas where the gas is at a sufficient temperature to prevent quenching of the active species and to permit reaction of the active species with the acid producing constituent.

14. The method of claim 13 wherein the precursor is ammonia and radicals including NH and $NH_2$ are produced as the active species.

15. The method of claim 13 wherein the acid producing constituent is $NO_x$ and the active species precursor is provided in a stoichiometric amount of no more than 300% that of the $NO_x$.

16. The method of claim 15 wherein the active species precursor is entrained in a carrier gas selected from argon and helium.

17. The method of claim 15 wherein the mole ratio of active species precursor to carrier gas is in a range of about 1:5 to 1:20.

* * * * *